(12) United States Patent
Ahn

(10) Patent No.: US 9,274,560 B2
(45) Date of Patent: Mar. 1, 2016

(54) FLEXIBLE DISPLAY DEVICE

(71) Applicant: Sung-Sang Ahn, Yongin (KR)

(72) Inventor: Sung-Sang Ahn, Yongin (KR)

(73) Assignee: SAMSUNG DISPLAY CO., LTD., Yongin, Gyunggi-Do (KR)

( * ) Notice: Subject to any disclaimer, the term of this patent is extended or adjusted under 35 U.S.C. 154(b) by 396 days.

(21) Appl. No.: 13/627,315

(22) Filed: Sep. 26, 2012

(65) Prior Publication Data

US 2014/0003006 A1    Jan. 2, 2014

(30) Foreign Application Priority Data

Jun. 28, 2012    (KR) .................... 10-2012-0070236

(51) Int. Cl.
*H05K 1/00* (2006.01)
*G06F 1/16* (2006.01)

(52) U.S. Cl.
CPC ............ *G06F 1/1652* (2013.01); *G06F 1/1679* (2013.01)

(58) Field of Classification Search
USPC ..................................... 361/749, 748, 679.02
See application file for complete search history.

(56) References Cited

U.S. PATENT DOCUMENTS

| | | | |
|---|---|---|---|
| 7,515,406 B2 | 4/2009 | Kee et al. | |
| 7,633,491 B2 * | 12/2009 | Okamoto | 345/173 |
| 2008/0034578 A1 * | 2/2008 | Lee et al. | 29/622 |
| 2009/0180049 A1 * | 7/2009 | Lee et al. | 349/58 |
| 2010/0182265 A1 | 7/2010 | Kim et al. | |
| 2011/0210937 A1 | 9/2011 | Kee et al. | |
| 2012/0249891 A1 * | 10/2012 | Sato et al. | 348/794 |
| 2013/0021762 A1 * | 1/2013 | van Dijk et al. | 361/749 |

FOREIGN PATENT DOCUMENTS

| | | |
|---|---|---|
| KR | 10-2008-0035709 A | 4/2008 |
| KR | 10-2008-0093340 | 10/2008 |
| KR | 10-2010-0082451 | 7/2010 |
| KR | 10-2011-0098349 | 9/2011 |

* cited by examiner

*Primary Examiner* — Andargie M Aychillhum
(74) *Attorney, Agent, or Firm* — Lee & Morse, P.C.

(57) ABSTRACT

A flexible display device includes a housing, a supporting plate, and a flexible panel. The housing has a central plate, a first wing plate, and a second wing plate, and the first and second wing plates are arranged on edges of the central plate, respectively. The supporting plate is on a surface of the housing, and the supporting plate is combined with the central plate and the first and second wing plates. The flexible panel is combined with the supporting plate. A flat state and a bending state of the flexible panel are provided according to states of the first and second wing plates with respect to the central plate.

17 Claims, 3 Drawing Sheets

FLEXIBLE DISPLAY DEVICE

CROSS-REFERENCE TO RELATED PATENT APPLICATION

This application claims priority under 35 U.S.C. §119 to Korean Patent Application No. 10-2012-0070236, filed on Jun. 28, 2012, in the Korean Intellectual Property Office, the disclosure of which is incorporated herein in its entirety by reference.

BACKGROUND

Flexible flat panel devices such as organic light-emitting devices are sought.

Flexible flat panel devices may be used in a flat state and also in a curved or bent state.

SUMMARY

Embodiments may be realized by providing a flexible display device including a housing that has a central plate and first and second wing plates respectively disposed on edges of the central plate; a supporting plate that is combined with the central plate and the first and second wing plates and is formed on a surface of the housing; and a flexible panel combined with the supporting plate, wherein a flat state and a bending state of the flexible panel are realized according to states of the first and second wing plates with respect to the central plate.

The flexible display device may further include a locking device that fixes the first and second wing plates with respect to the central plate. The locking device may include protrusions that respectively protrude from the first and second wing plates towards the central plate, groove members that are movably installed in the central plate and include grooves into which the protrusions are inserted, and springs that elastically bias the groove members towards the protrusion direction.

The protrusions respectively include a bending fixing protrusion that is inserted into the groove in a bent state of the housing, and a spread fixing protrusion that is inserted into the groove in a flat state of the housing. The supporting plate may be formed of a material that has an elastic restoration force or a plastic deformation within a displacement range of the housing or a shape memory alloy.

The supporting plate may not be fixed on but is separated from the housing on a gap between the central plate and the first wing plate and on a gap between the central plate and the second wing plate. The supporting plate may be combined with the housing via welding or screws. The supporting plate may be combined with an inner surface of the housing when the housing is bent.

BRIEF DESCRIPTION OF THE DRAWINGS

Features will become apparent to those of ordinary skill in the art by describing in detail exemplary embodiments thereof with reference to the attached drawings in which.

DETAILED DESCRIPTION

Figure 1:
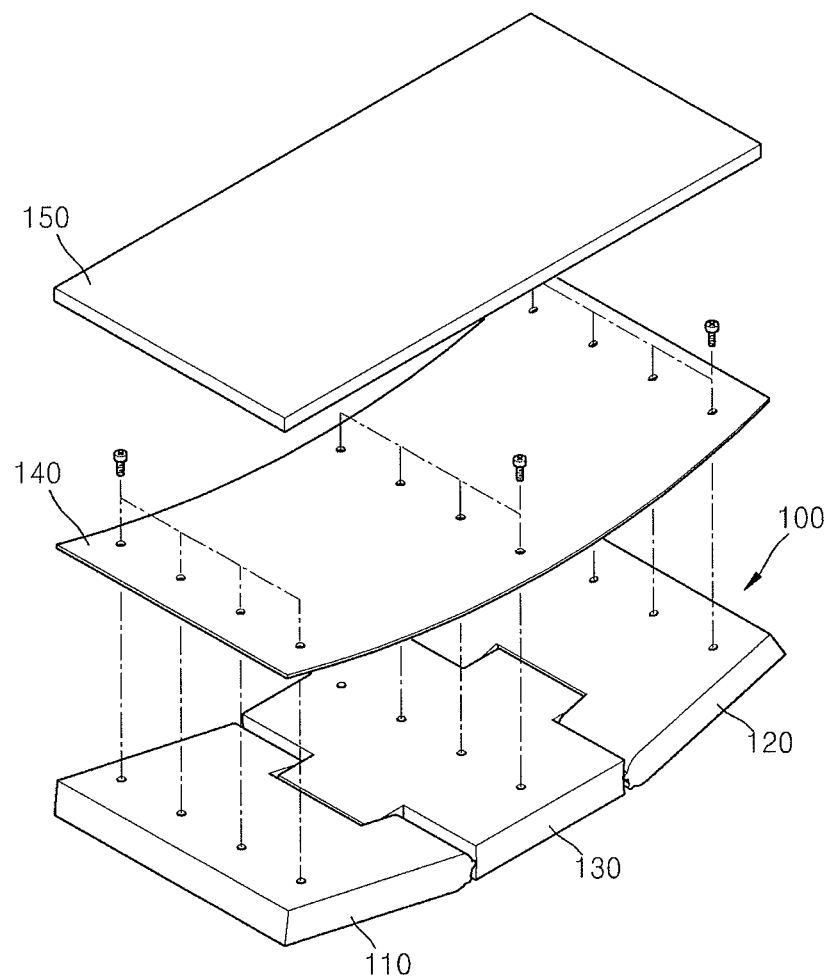
FIG. 1 is an exploded perspective view of a flexible display device according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when an element is referred to as being "on" another element, it can be directly on the other element, or intervening elements may also be present. Like reference numerals refer to like elements throughout.

FIGS. 1 through 3B are drawings showing a flexible display device according to an exemplary embodiment.

Referring to FIG. 1, the flexible display device according to the current embodiment includes a housing 100 that may be disposed in a flat state or a bent state. A supporting plate 140 may be coupled to an inner surface of the housing 100 by, e.g., screws S, and a flexible panel 150 may be attached to the supporting plate 140.

The flexible panel 150 is a display unit in which, e.g., a transistor, a light-emitting device, and a sealing layer that protects the transistor and the light-emitting device are stacked on a substrate formed of a flexible material plastic. The flexible material may be a flexible plastic such as a polyimide. Hereafter, the combination of these elements are altogether simply referred to as the flexible panel 150. Since the flexible panel 150 is formed of a flexible substrate, the bending transformation of the flexible panel 150 may be smoothly achieved.

The housing 100 is a support for the flexible panel 150, e.g., to stably realize a bending and flattening movement of the flexible panel 150. The flexible panel 150 may be stably attached to the supporting plate 140 so that a shape of the flexible panel 150 corresponds to a shape of the supporting plate 140. The housing 100 may be flexibly attached to the supporting plate 140 so that a shape of the housing 100 is different, e.g., more jagged or sharply cornered, than the shape of the supporting plate 140 and the shape of the flexible panel 150.

The housing 100 may include a central plate 130 and first and second wing plates 110 and 120 on respective edges of the central plate 130. For example the housing 100 may be dividing in three parts, e.g., equal parts, in which the central plate 130 is at a center and the first and second wing plates 110 and 120 are arranged adjacent to opposing sides of the central plate 130.

The housing 100 has a structure in which the central plate 130 and the first and second wing plates 110 and 120 are connected to one body by the supporting plate 140. That is, the central plate 130 and the first and second wing plates 110 and 120 are separated from each other. However, the supporting plate 140 combines the separated three plates into one interconnected body. Accordingly, although the first and second wing plates 110 and 120 and the central plate 130 may not be separated from each other because they are connected by the supporting plate 140, the first and second wing plates 110 and 120 may rotate with respect to the central plate 130.

Figure 3A:
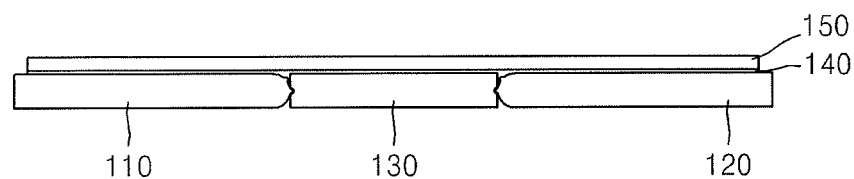
FIG. 3A is a lateral view of a flat state of the flexible display device of FIG. 1.
Figure 3B:
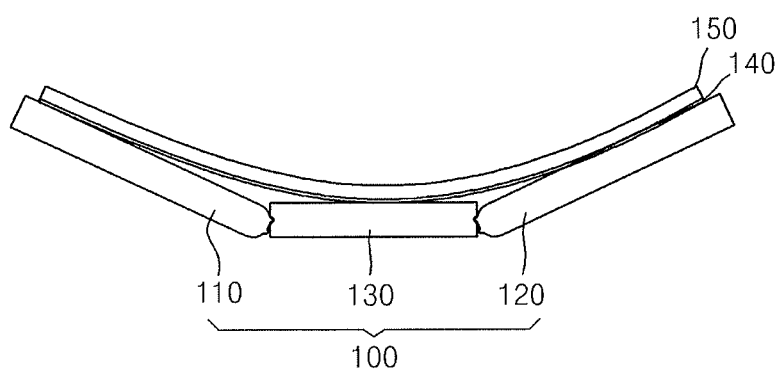
FIG. 3B is a lateral view of a bent state of the flexible display device of FIG. 1.

The rotation range of the first and second wing plates 110 and 120 is between a position at which the housing 100 is placed in a flat state (refer to FIG. 3A) and position at which the housing 100 is in a bent state (refer to FIG. 3B). When the housing 100 is flat, the flexible panel 150 combined by the supporting plate 140 is also in a flat state. When the housing 100 is bent, the flexible panel 150 is also in a bending state. Accordingly, the flexible panel 150 may be used in a flat state or a bent state.

A locking device may be included to fix the first and second wing plates 110 and 120 in the flat state or bent state of the housing 100. The locking device is described referring to FIG. 2. The first wing plate 110 includes at least two protrusions 110a and 110b, and the second wing plate 120 includes at least two protrusions 120a, and 120b. The protrusions 110a and 120a are spread fixing protrusions 110a and 120a, and the protrusions 110b and 120b are bending fixing protrusions 110b and 120b.

The spread fixing protrusions 110a and 120a may each include at least one spread fixing protrusion 110a and 120a, respectively, formed along sides of the first and second wing plates 110 and 120, respectively, that is adjustable so as to be selectively adjacent to the central plate 130. For example, each of the first and second wing plates 110 and 120 may include one spreading fixing protrusions 110a and 120a, respectively, arranged to form the flat state. The bending fixing protrusions 110b and 120b may include a plurality of bending fixing protrusions 110b and 120b, respectively, that are adjustable to be selectively adjacent to the central plate 130 to form at least one bending states. For example, each of the plurality of bending fixing protrusions 110b and 120b may represent one of a plurality of bending states.

Also, the central plate 130 includes moveable groove members 130a that are elastically biased by a spring 130b towards the protrusions 110a, 110b, 120a, and 120b. For example, the groove members 130a may move toward and away from the protrusions 110a, 110b, 120a, and 120b by operation of the spring 130b. Accordingly, ones of the protrusions 110a, 110b, 120a, and 120b may be adjustable so as to be selectively arranged within ones of the groove members 130a.

Figure 2:
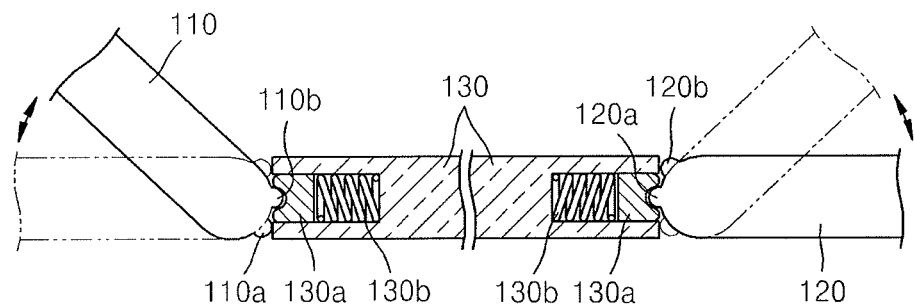
FIG. 2 is a cross-sectional view of a locking device included in the flexible display device of FIG. 1.

Accordingly, when the first and second wing plates 110 and 120 respectively rotate so that the housing 100 is in a bent state as shown by the first wing plate 110 in the left side of FIG. 2, the bending fixing protrusions 110b and 120b are elastically inserted into the groove members 130a. Thus, the first and second wing plates 110 and 120 may not freely rotate since the elastic force of the spring 130b is applied to the bending fixing protrusions 110b and 120b. When a force greater than the elastic force of the spring 130b is applied to the first and second wing plates 110 and 120, the locking is released and the first and second wing plates 110 and 120 may rotate.

On the other hand, when the first and second wing plates 110 and 120 respectively rotate so that the housing 100 is in a flat state as shown by the first wing plate 110 in the right side of FIG. 2, the spread fixing protrusions 110a and 120a are elastically inserted into the groove members 130a. Thus, the first and second wing plates 110 and 120 may not be freely rotated since the elastic force of the spring 130b is applied to the bending fixing protrusions 110b and 120b. When a force greater than the elastic force of the spring 130b is applied, e.g., by a pressure source, to the first and second wing plates 110 and 120, the locking is released and the first and second wing plates 110 and 120 may rotate.

The supporting plate 140 may be formed of an elastic member such as a thin steel plate to obtain an elastic deformation within a rotation range of the housing 100, e.g., within a displacement range of the housing 100. Accordingly, when the housing 100 is bent, an elastic force to return the housing 100 to an original flat state may be applied, e.g., to the supporting plate 140. Although the supporting plate 140 may not easily return to the original position due to the locking device described above, when the locking device is released, the supporting plate 140 and the housing 100 may rapidly return to the their respective horizontally flat states by the elastic restoration force. The supporting plate 140 may be combined with the central plate 130 and the first and second wing plates 110 and 120 via screws S. However, the supporting plate 140 is not entirely fixed, e.g., regions of the supporting plate 140 may be in a separated state due to gaps between the central plate 130 and the first and second wing plates 110 and 120, e.g., as illustrated in FIG. 3B.

Accordingly, although the first and second wing plates 110 and 120 rotate with respect to the central plate 130, the supporting plate 140 is not folded but bent, and also, the flexible panel 150 attached to the supporting plate 140 is bent as well. That is, folding of the flexible panel 150 due to the bending and flattening operation of the housing 100 does not occur. The combination of the supporting plate 140 with the housing 100 may be achieved by welding instead of screw S.

The flexible display device having the structure described above may be used as follows.

First, in order to use the flexible panel 150 in a flat state as depicted in FIG. 3A, the first and second wing plates 110 and 120 of the housing 100 are horizontally flattened with respect to each other so as to be in a flat state. At this point, the bending fixing protrusions 110b and 120b may be elastically inserted into the groove member 130a, and a locking state may be maintained by an elastic force of the spring 130b. Accordingly, an image displayed by the completely flattened flexible panel 150 may be seen.

On the other hand, in order to use the flexible panel 150 in a bending state as depicted in FIG. 3B, the first and second wing plates 110 and 120 of the housing 100 are rotated so that other protrusions such as the bending fixing protrusions 110b and 120b are elastically inserted into the groove member 130a. The bending state may include a plurality of bending states that vary by the angle formed by the first and second wing plates 110 and 120 relative to the central plate 130.

In the bending state, a locking state also be maintained by an elastic force of the spring 130b, and thus, an image displayed by the smoothly bent flexible panel 150 may be seen. At this point, since the supporting plate 140 and the flexible panel 150 are in a separated state due to gaps between the central plate 130 and the first and second wing plates 110, damage to the supporting plate 140 and the flexible panel 150 in areas corresponding to the gaps may not occur. Accordingly, the flexible display device having the structure described above may stably maintain the bending state and flat state of the flexible panel 150.

For example, the supporting plate 140 may be spaced apart from sharply bent or rigidly bent portions of the housing 100 so that the supporting plate 140 and the flexible panel 150 may maintain a smoothly curved shape in the bending state. In other words, the curved portions of the supporting plate 140 and the flexible panel 150 may not include sharp corners. Further, end portions of the supporting plate 140 may be attached to the housing 100, e.g., with no gaps therebetween, so that the supporting plate 140 is moveable in synchronization with the flat and bending states of the housing 100. Accordingly, the gaps between the housing 100 and the supporting plate 140 may only be present in an area surrounding where the central plate 130 meets the first and second wing plates 110 and 120.

In the current embodiment, a relatively complicated locking device that includes the spread fixing protrusions 110a and 120a, the bending fixing protrusions 110b and 120b, the groove member 130a, and the spring 130b may be employed to reduce the possibility of and/or prevent an undesired rotation of the housing 100. However, embodiments are not limited thereto, e.g., a structure in which the locking device is omitted may be realized.

Figure 4:
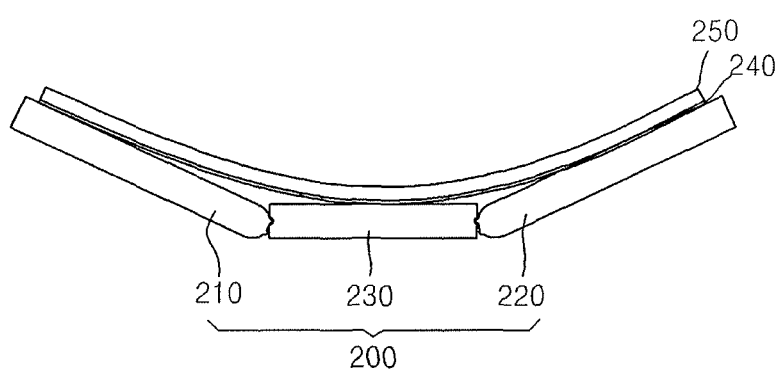
FIGS. 4 and 5 are lateral views of flexible display devices according to exemplary embodiments.

FIG. 4 is lateral view of a flexible display device substantially similar to the flexible display device in FIG. 1, except a locking device is omitted, according to another exemplary embodiment. The flexible display device of FIG. 4, like the flexible display device of FIG. 1, includes a housing 200 that includes a central plate 230, first and second wing plates 210 and 220, a supporting plate 240, and a flexible panel 250. Thus, a flat state and a bending state of the flexible panel 250 are realized while the first and second wing plates 210 and 220 are rotationally displaced with respect to the central plate 230.

As no locking device is used in the flexible display device of FIG. 4, the supporting plate 240 is formed of a material such as an aluminum thin film that generates a plastic deformation within a rotational range of the housing 200. For example, the supporting plate 240 may have a plastic deformation range in which the support plate 240 is capable of undergoing deformation due to factors such as tensile stress, load, etc. The range of plastic deformation may be based on a displacement range of the housing 200.

A plastic deformation may be generated in a bent state when the housing 200 is bent, and thus, the corresponding position is locked. When the housing 200 is in a flat state, another plastic deformation may be generated in the flat state, and thus, the corresponding position is locked. Accordingly, in order not to use a locking device, the supporting plate 240 may be formed of a material that selectively generates plastic deformation states.

Figure 5:
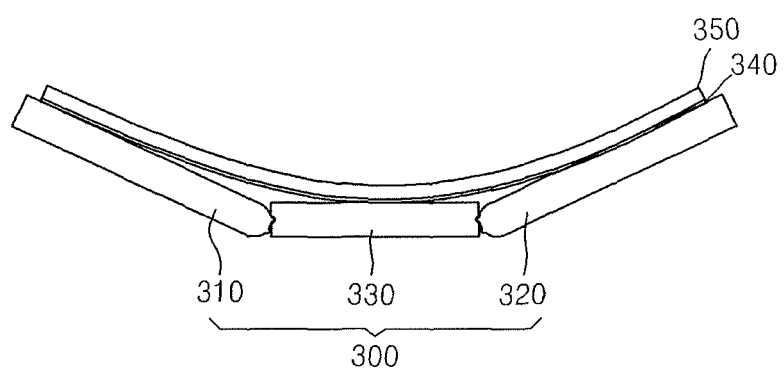

As another example of not using the locking device, as depicted in FIG. 5, a supporting plate 340 may be formed of a shape memory alloy. That is, the flexible display device according to the current embodiment, like the flexible display device of FIGS. 1 and 4, includes a housing 300 that includes a central plate 330, first and second wing plates 310 and 320, a supporting plate 340, and a flexible panel 350. Thus, a flat state and a bent state of the flexible panel 350 are realized while the first and second wing plates 310 and 320 are rotationally displaced with respect to the central plate 330.

As no locking device is used, the supporting plate 340 is formed of a shape memory alloy that is deformed by factors such as heat, electricity, etc, within a displacement range of the housing 300. For example, when the supporting plate 340 is formed of a shape memory alloy that is in a bent state at room temperature and in flat state when heat or electricity is applied thereto. In order to view an image on a flat state of the flexible panel 350, heat or electricity is applied to the supporting plate 340 and the housing 300. In order to view an image on a bent state of the flexible panel 350, a room temperature environment is maintained so that the supporting plate 340 bends together with the housing 300. Thus, a locking device may not be used by forming the supporting plate 340 of a shape memory alloy.

By way of summation and review, a flexible display device is characterized by a bending characteristic. If the bending transformation of a bending portion is not smooth and stable, the bending portion may be rigidly bent, which may cause damage to the flexible display device. Accordingly, a flat panel with a smooth and stable bending transformation is sought.

Accordingly, embodiments relate to flexible display device and to a flexible display device having a smooth and stable bending transformation. In the flexible display device according to embodiments, a bending portion of a flexible panel may be smoothly guided so as not to generate a severe bending deformation of the flexible panel. Therefore, when the flexible display device is employed, a product with stable bending and restoration operations may be realized. In this regard, embodiments relate to a flexible display device that may smoothly guide the flexible panel so as not to generate a severe bending deformation and so that a product with stable bending and restoration operations may be realized.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A flexible display device, comprising:
a housing including a central plate, a first wing plate, and a second wing plate, the first and second wing plates, connected to the central plate, moveable with respect to the central plate, and being arranged on edges of the central plate, respectively;
a supporting plate on a surface of the housing, the supporting plate being combined with the central plate and the first and second wing plates;
a flexible panel directly fixed to the supporting plate; and
a locking device that fixes positions of the first and second wing plates with respect to the central plate,
a flat state and a bending state of the flexible panel being provided according to different positions of the first and second wing plates with respect to the central plate,
wherein the first, second, and central plates being present as distinct plates in each different position, and
wherein the locking device includes:
protrusions protruding from the first and second wing plates, respectively, towards the central plate,
groove members that are movably installed in the central plate, the groove members including grooves in which ones of the protrusions are selectively inserted, and
springs that elastically bias the groove members toward the protrusions.

2. The flexible display device of claim 1, wherein the supporting plate includes a material that has an elastic restoration force within a displacement range of the housing.

3. The flexible display device of claim 1, wherein the supporting plate is includes a material that has a plastic deformation range within a displacement range of the housing.

4. The flexible display device of claim 1, wherein the supporting plate is includes a shape memory alloy.

5. The flexible display device of claim 1, wherein portions of the supporting plate are in a non-fixed arrangement with the housing such that the supporting plate is separable from the housing based on gaps between the central plate and the first and second wing plates.

6. The flexible display device of claim 1, wherein the supporting plate is combined with the housing via welding or screws.

7. The flexible display device of claim 1, wherein the supporting plate is combined with an inner surface of the housing in the bent state.

8. The flexible display device of claim 1, wherein the central plate is a single continuous planar plate in both a flat state and a bending state of the flexible panel.

9. The flexible display device of claim 1, wherein the first wing plate, second wing plate, the central plate lay in a common plane in a flat state of the flexible panel.

10. The flexible display device of claim 1, wherein the supporting plate is directly attached to the first wing plate, the second wing plate, and the central plate.

11. The flexible display device of claim 1, wherein a width of the supporting plate is equal to a width of the flexible panel.

12. The flexible display device of claim 1, wherein a shape of the flexible panel corresponds to a shape of the supporting plate of the flexible panel in both a flat state and a bending state of the flexible panel.

13. A flexible display device, comprising:
   a housing including a central plate, a first wing plate, and a second wing plate, the first and second wing plates being arranged on edges of the central plate, respectively;
   a supporting plate on a surface of the housing, the supporting plate being combined with the central plate and the first and second wing plates;
   a flexible panel combined with the supporting plate, a flat state and a bending state of the flexible panel being provided according to states of the first and second wing plates with respect to the central plate; and
   a locking device that fixes positions of the first and second wing plates with respect to the central plate, wherein the locking device includes:
   protrusions protruding from the first and second wing plates, respectively, towards the central plate,
   groove members that are movably installed in the central plate, the groove members including grooves in which ones of the protrusions are selectively inserted, and
   springs that elastically bias the groove members toward the protrusions.

14. The flexible display device of claim 13, wherein the protrusions include:
   a bending fixing protrusion that is inserted into a corresponding one of the grooves in the bent state, and
   a spread fixing protrusion that is inserted into a corresponding one of the grooves in the flat state.

15. The flexible display device of claim 13, wherein portions of the supporting plate are in a non-fixed arrangement with the housing such that the supporting plate is separable from the housing based on gaps between the central plate and the first and second wing plates.

16. The flexible display device of claim 13, wherein the supporting plate is combined with the housing via welding or screws.

17. The flexible display device of claim 13, wherein the supporting plate is combined with an inner surface of the housing in a bending state of the flexible panel.

* * * * *